Patented Feb. 22, 1927.

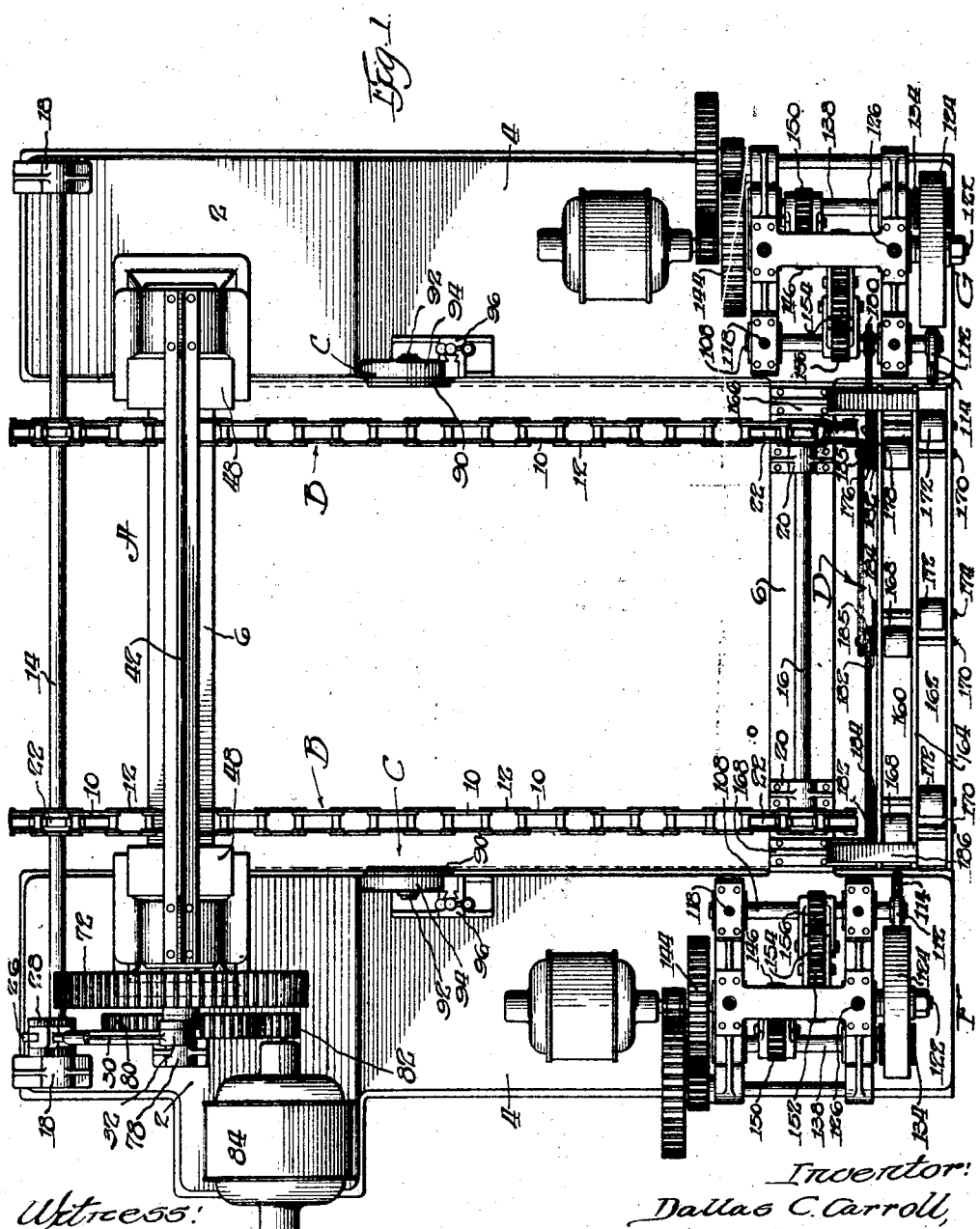

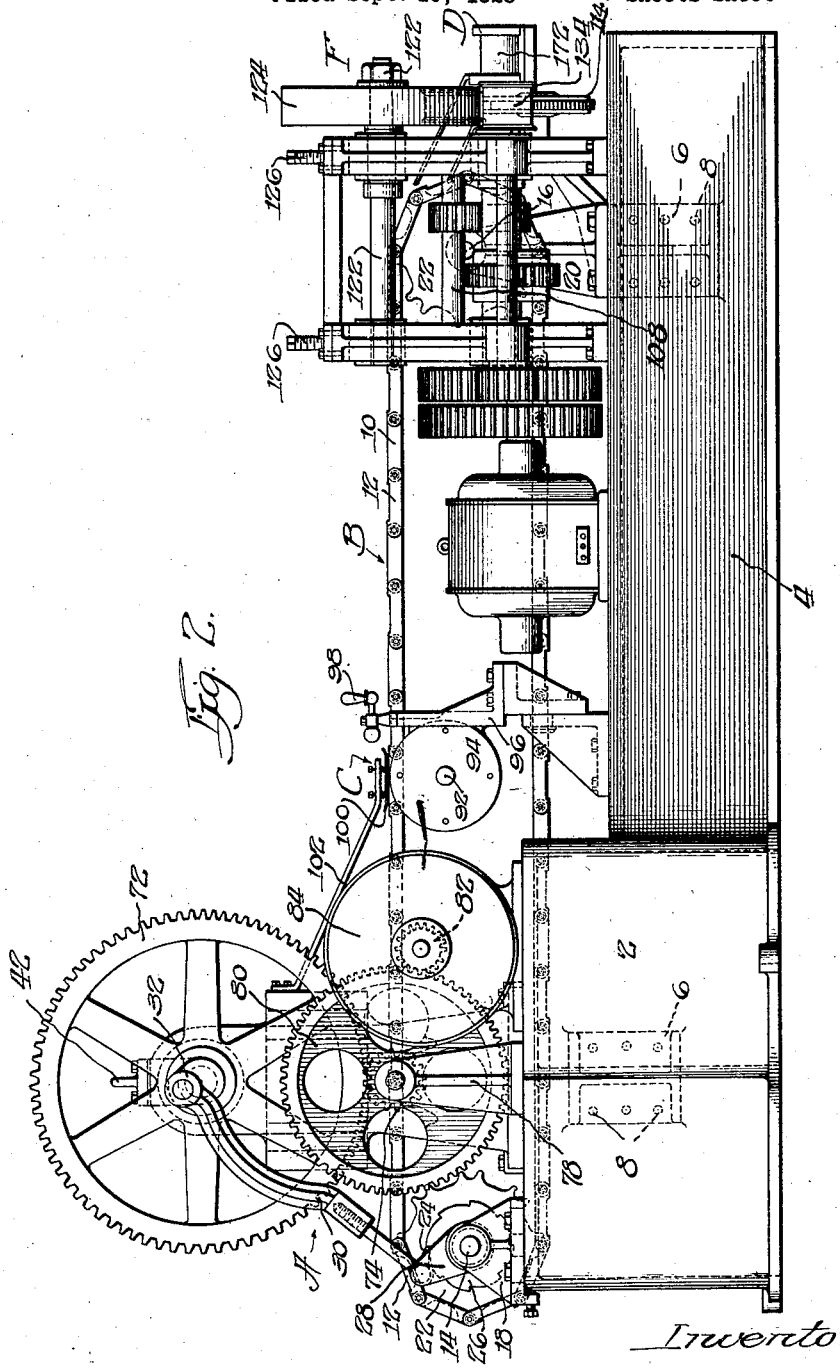

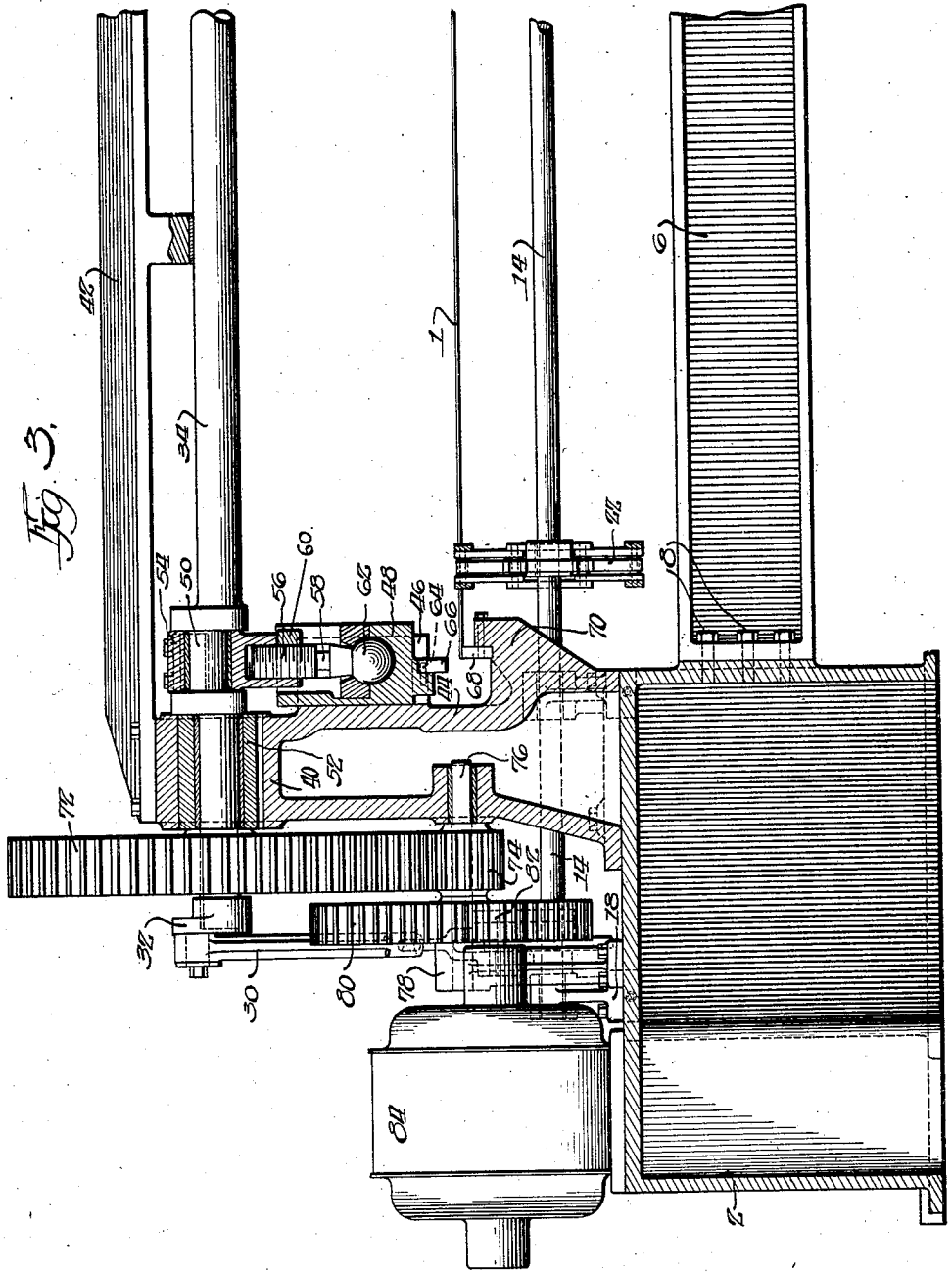

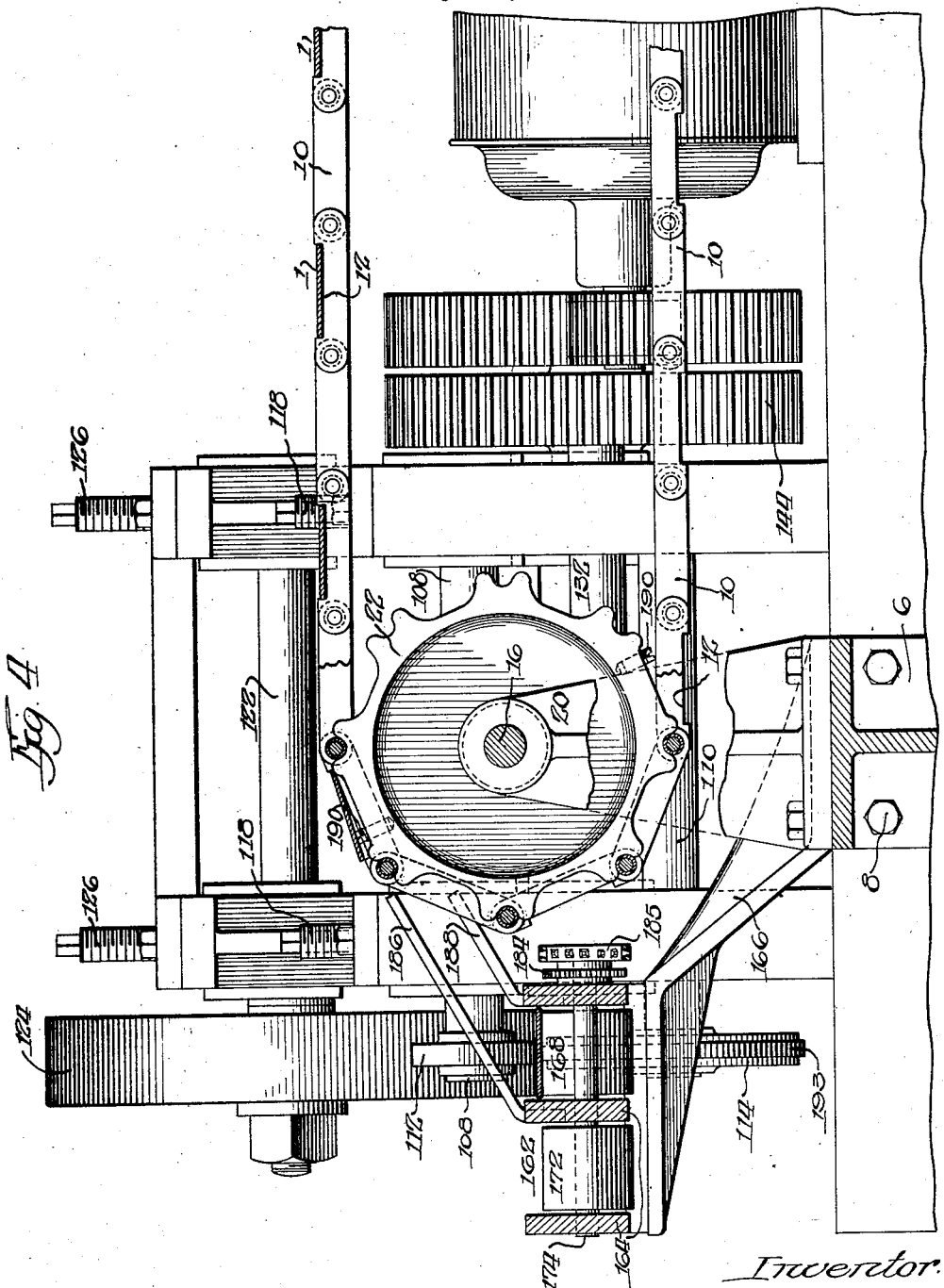

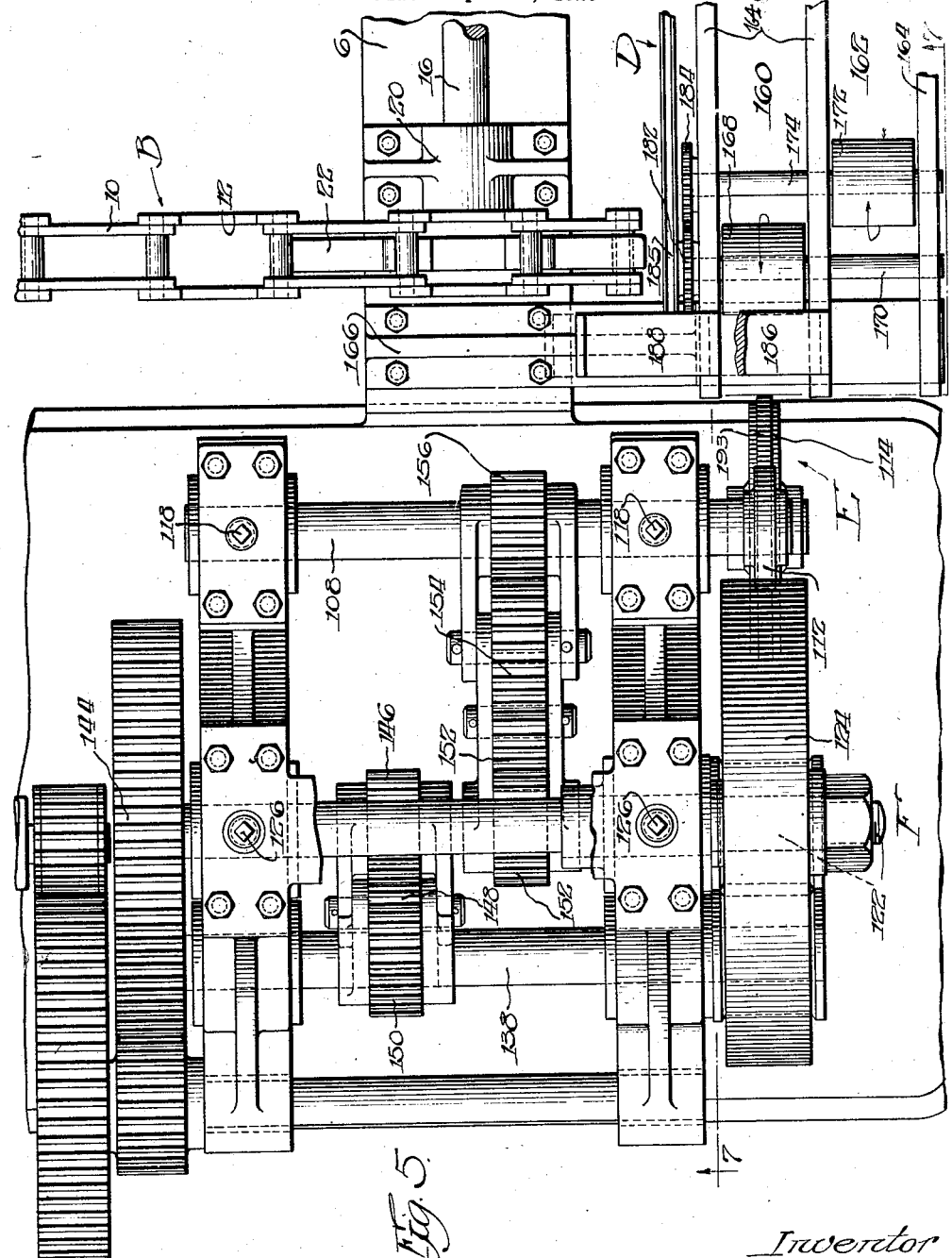

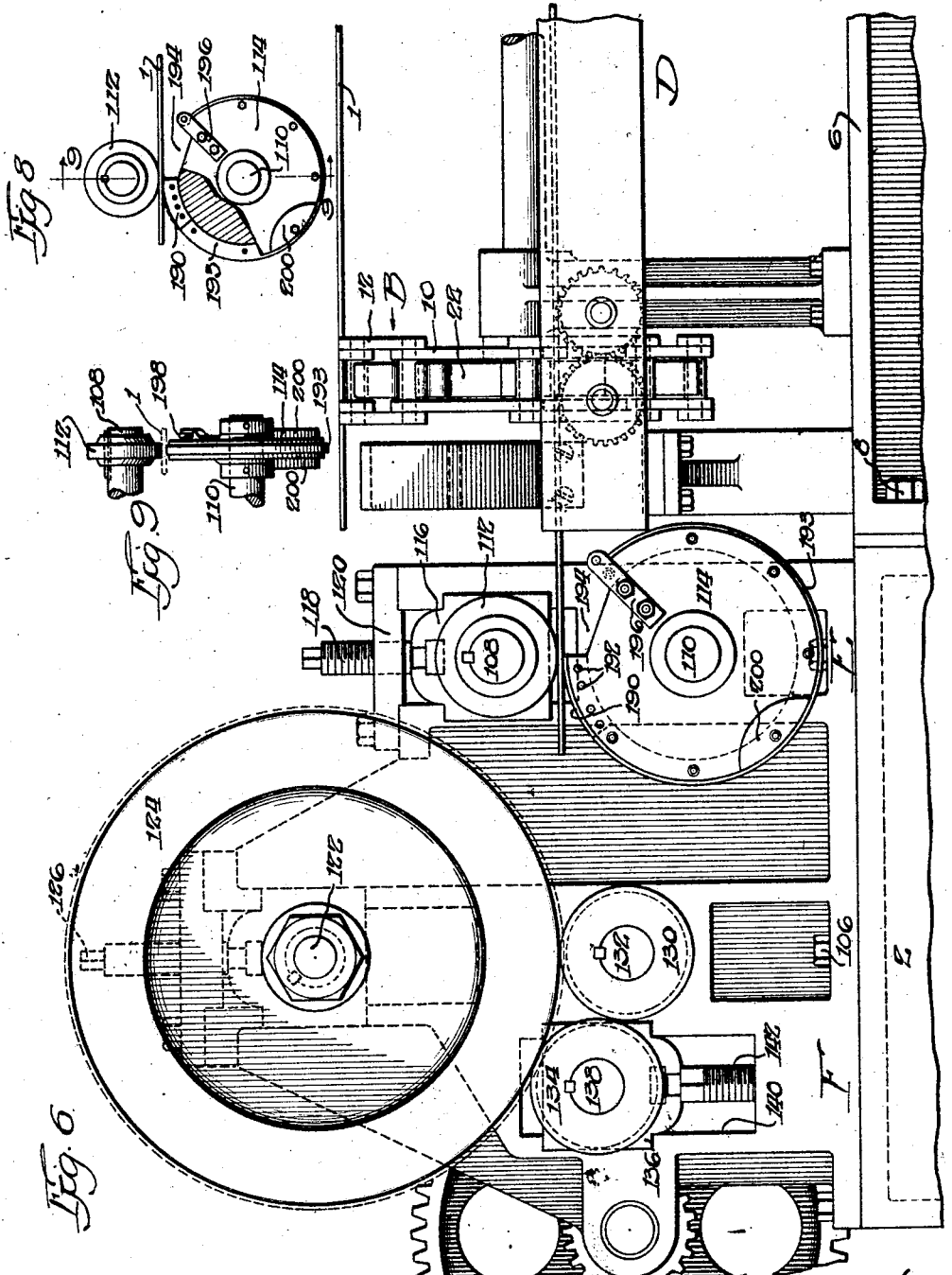

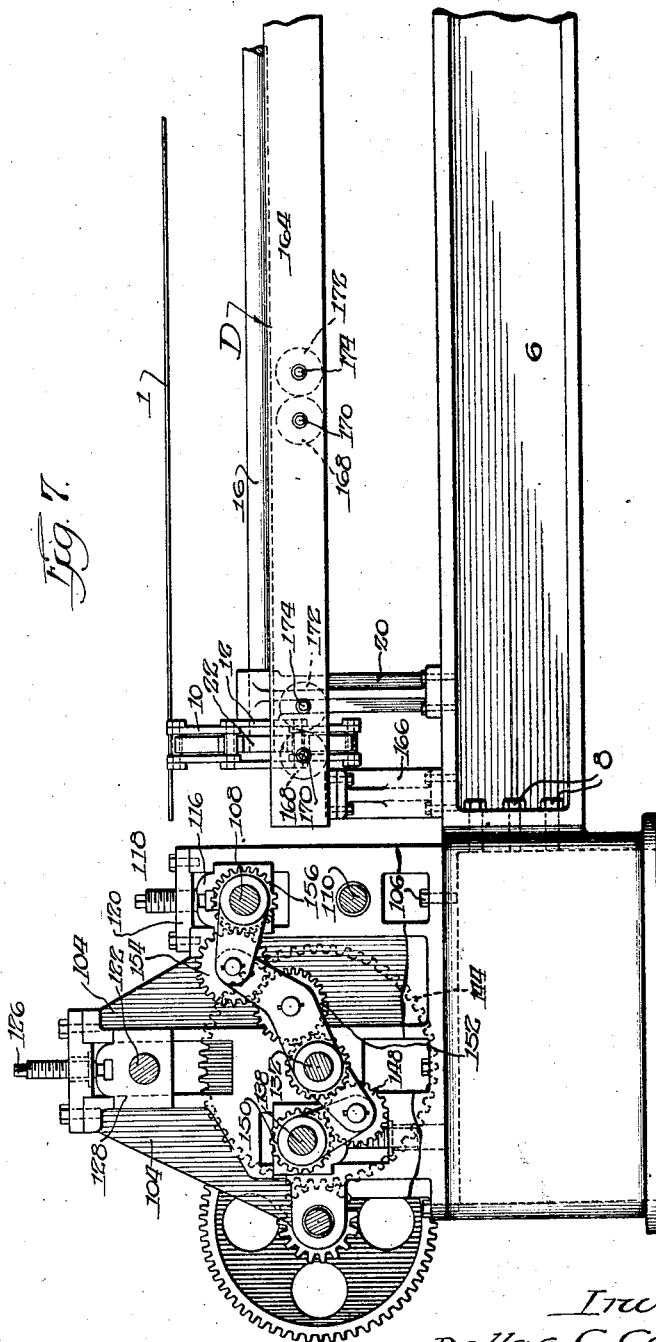

1,618,812

UNITED STATES PATENT OFFICE.

DALLAS C. CARROLL, OF AKRON, OHIO, ASSIGNOR TO THE FIRESTONE STEEL PRODUCTS COMPANY, OF AKRON, OHIO, A CORPORATION OF OHIO.

MACHINE FOR MANUFACTURING RIMS.

Application filed September 19, 1923. Serial No. 663,566.

This invention relates to a machine for use in the manufacture of annular objects, such as automobile rims and the like, and has particular reference to machines for forming and shaping the blanks from which the rims are made preparatory to the welding operation.

A general object of this invention is to provide a machine of the type indicated, in which the blanks from which the rims are formed are cut to the proper length, subjected to a polishing and stamping operation and bent to annular form, the treatment of the blanks being entirely automatic without the necessity of manual aid or personal attention.

A feature of the invention consists in means for automatically transferring the blanks through a plurality of operating instrumentalities in such a way as to reduce the handling of the rims to a minimum and greatly increasing the production in an efficient and thorough manner.

A further feature of the invention resides in the provision of shearing, polishing, stamping and circling means arranged to operate successively on a blank form from which a rim is formed, combined with means movable to carry the blank successively to the said means.

Another feature of the invention resides in the provision of novel stamping mechanism by means of which the blanks are stamped and in which means are present for insuring that each blank will be stamped only once.

These and other features of the invention will appear more fully from the following detailed description when read in connection with the accompanying drawings and will be pointed out in the appended claims.

In the drawings:

Figure 1 is a plan view of the embodiment of the machine selected to illustrate the invention;

Figure 2 is a side elevation thereof;

Figure 3 is an elevation (partly in section) of one end of the shearing mechanism looking toward the front of the machine;

Figure 4 is the transfer and circling mechanism taken along the line 4—4 of Figure 1;

Figure 5 is a plan view of one of the circling mechanisms;

Figure 6 is an end elevation of Figure 5;

Figure 7 is a view taken along lines 7—7 of Figure 5;

Figure 8 is a side elevation of the stamping mechanism;

Figure 9 is a section taken on line 9—9 of Figure 8.

In its general aspects, the machine includes a shearing mechanism A for trimming the edges of the blank, a conveyor B for supporting and conveying the blanks, polishing devices C for preparing the ends of the blank for the welding operation, transferring mechanism D for receiving the blanks and feeding them into stamping devices E, and circling mechanisms F and G for bending the blanks into annular form.

The operating parts of the machine are supported upon suitable standards 2 connected by side bars 4 and cross bars 6 secured to the standards in any desirable manner, such as by means of bolts 8.

The endless conveyor B is arranged to travel through the length of the machine. The conveyor comprises duplicate endless chains 10 held in laterally spaced relation. Alternate links of the chains are provided with recesses 12 in which the blanks 1 from which the rims are formed are adapted to seat in the manner clearly shown in Figure 4.

Cross shafts 14 and 16 are journaled in brackets 18 and 20 respectively at opposite ends of the machine, and are provided with spaced sprockets 22 about which the chains are trained.

Intermittent movement is imparted to the conveyor B by a pawl 24 arranged to engage ratchet 26 secured to one end of the shaft 14. The pawl 24 is secured to the upper end of an arm 28 mounted for pivotal movement about the shaft 14. The arm 28 is connected by an adjustable link 30 to a crank 32 mounted upon the outer end of a continuously driven shaft 34.

Arising above the standards 2 at the front end of the machine are oppositely disposed vertical U-shaped brackets 40 connected at their upper ends by a cross bar 42. Formed upon the inner face 44 of the brackets 40 are vertical guideways 46 in which blocks or knife carriers 48 are mounted for reciprocating movement. Movement is imparted to the carriers 48 by means of an eccentric 50 formed upon the horizontal shaft 34 extending through suitable bearings 52 carried by the upper end of the brackets 40. Surrounding the eccentric 50 is a strap 54 of conventional construction and having the lower end thereof recessed to receive the threaded end 56 of a connecting arm 58, a half nut 60 serving to retain the arm in adjusted position within the recess. The arm 58 is connected to the knife carrier 48 by a ball and socket joint 62.

Secured to the carrier 48 by a screw 64 is a cutting element 66 adapted to cooperate with a stationary cutting element 68 which is fixed to a lug 70 projecting inwardly from the bracket 40 in the path of the reciprocating cutter.

It will thus be seen that rotation of the shaft 34 will cause a step-by-step advancement of the conveyor B and an intermittent movement of the shearing knives 66. The movements of the conveyor and knives are synchronized in such a manner as to advance the blanks during the upward stroke of the knives and hold the blanks stationary during the downward or cutting stroke.

Upon the end of shaft 34 is mounted a gear 72 which is driven by a pinion 74 carried by a shaft 76 having its inner end journaled in the bracket 40 and the outer end supported in bracket 78. The shaft is provided with a gear 80 which meshes with a pinion 82 mounted upon the rotor of an electric motor 84 conveniently supported upon the standard 2.

Preparatory to the welding operation, it is highly desirable to polish the ends of the blanks in order to remove all dirt and rust therefrom in order to secure a clean contact with the welding mechanism. To this end a polishing unit C is arranged along the path of the conveyor B at each side of the machine. Each polishing unit consists of an emery wheel 90 rotatably mounted upon a shaft 92 carried by a suitable housing 94 upon the upper end of an adjustable bracket 96. The wheels 90 are preferably arranged for vertical adjustment to compensate for wear thereof, the desired adjustment being effected in the illustrated embodiment by means of a handle 98, the operation of which produces vertical movement of the housing 94 with respect to the bracket 96 in a conventional and well known manner.

The ends of the blank 1 project beyond the conveyor and are moved over the surface of the polishing wheels during the advancing movement of the conveyor. Arranged above each wheel 90 is a spring pressed shoe 100 carried by a bracket 102 secured to the bracket 40. The ends of the blank are yieldingly pressed by the shoes 100 into contact with the surface of the polishing wheels in a manner readily understood.

After the shearing and polishing operations, the blanks 1 are transferred to circling devices F and G by mechanism to be hereinafter described. Two circling devices are shown, one being located at each side of the rear of the machine. These devices are duplicates and therefore a description of one will suffice, it being noted, however, at this point, that the devices are staggered with respect to one another for a purpose to appear further on in this description.

The circling device comprises spaced end brackets 104 secured to the standard 2 by means of bolts 106. Mounted upon the outer ends of parallel shafts 108 and 110 journaled in the brackets 104 is a pair of rollers 112 and 114 by means of which the blanks are fed and guided into the device. The lower roller 114 is idly mounted upon its shaft 110, while the upper roll is keyed to the shaft 108 and is arranged to be positively driven. The bearing blocks 116, in which the shaft of the upper roller 112 is mounted, are vertically adjustable by means of screws 118 extending through cross bars 120, the arrangement permitting the roller 112 to be raised and lowered in accordance with the thickness of the blank 1.

Centrally mounted between the brackets 104 is a shaft 122 upon the outer end of which a circling wheel 124 is loosely mounted. Vertical adjustment of the wheel 124 is secured by the screws 126 by means of which the bearings 128 are raised and lowered as desired.

Directly beneath the circling wheel 124 is a pressure and guide roll 130 which forces the blanks against the circling wheel and starts the bending thereof. The roll 130 is keyed upon a shaft 132 arranged below and parallel to the circling roll shaft 122. To the rear of the roll 130 and elevated with respect thereto is a second pressure roll 134 which is closely arranged to the periphery of the circling wheel, the combined action of the two rolls being to cause the blank to hug the surface of the circling roll and to be bent therearound into a circular form. The bearings 136, in which the shaft 138 of the roll 134 is supported, are slidable in ways 140 provided in the brackets 104, screws 142 being provided to secure the desired vertical adjustment.

The shaft 132 is connected through suitable reduction gearing, indicated generally at 144, to an electric motor or any other convenient source of power. The shaft 132 carries a gear 146 adapted to mesh with an idle gear 148, which, in turn, engages a gear 150 on the shaft 138 which carries the guide roll 134. From the shaft 132 power is communicated to the feed roll 112 through gears 152, 154 and 156 in the manner clearly shown in Figures 5 and 7. As previously pointed out, the circling roller 124 and the lower feed roll 114 are idly mounted.

The above mentioned general features of the construction and operation of the circling device differ in no essential respect from the construction and operation of circling machines of this type heretofore in use and require no further description.

The means for transferring the blanks from the endless conveyor B to the circling devices will now be described. Extending across the rear of the machine and substantially in line with the conveyor shaft 16 are a plurality of parallel runways 160 and 162, each of which delivers to one of the circling devices. These runways consist of vertical rails 164, supported upon the upper end of rearwardly offset brackets 166 mounted upon the cross bar 6. The runway 160 is provided with a plurality of supporting and feeding rollers 168 which are mounted upon horizontal shafts 170, similar rollers 172 carried upon shafts 174 being provided in the outer runway 162. The blanks are fed to the circling machine F by the runway 160 and to the circling machine G by the runway 162. To accomplish this opposite feeding of the blanks, it is, of course, necessary to drive the rolls in each runway in opposite directions. It will be observed that one roll in one runway is closely positioned with respect to a roll in the other, the arrangement being the preferred construction in facilitating the driving of the rolls, although not at all essential to the operation of the device as will be understood. Referring to Figure 1, the outer end of the end shaft 170 is provided with a sprocket 176 which is connected by a chain 178 to a sprocket 180 mounted upon the shaft 108 which is driven from the motor by means previously described. The shaft 170 carries a gear 182 which meshes with a gear 184 upon the end of the shaft 174. The shaft 170 is also provided with a second sprocket 185 which has a chain connection with a similar sprocket on the shaft 170 of the middle group of rolls. From this construction, it will be seen that the rolls 168 will operate to feed the blanks in the runway 160 in one direction, while the rolls 172 in runway 162 will feed them in the opposite direction.

The connections between the endless conveyor B and the runways 160 and 162 are clearly shown in Figure 4. These connections comprise a plurality of inclined plates 186 and 188 having one end adjacent the conveyor B and the other end secured to the middle and inner side rails respectively in a position to discharge the blanks into the several runways. Arrangement is made for equally dividing the blanks upon each runway so that the endless conveyor will deliver to each alternately. To this end the sprockets 22 are provided at predetermined points about their periphery with upstanding screws 190, the screws being arranged to engage alternate blanks on the conveyor and elevate the forward edge thereof so that the blank will be received by the inclined plates 186. The blanks not engaged by the screws will remain on the conveyor until they have passed the plates 186 and will fall upon the plates 188 which deliver to the runway 160.

In addition to the operations already described, this invention contemplates the provision of means for automatically stamping the blanks with a desired insignia, such as the date of manufacture and the name of the manufacturer. The accomplishment of this result is obtained by a peculiar and novel construction of the lower feed roll 114, previously referred to. Upon the periphery of the roll 114, a stamping die 190 is positioned by means of screws (not shown) passing through a downwardly extending leg of the die and holes 192 provided in the face of roll adjacent the edge thereof. Around the remaining periphery of the roll is secured a friction element or tire 193 of rubber or similar material, the outer surface of which is substantially flush with the face of the die. The roll 114 is idly mounted upon its supporting shaft 110 and is rotated by frictional engagement with the under surface of the blank 1.

In order to insure that each blank will only be stamped once, the construction is such that the roll 114 will be rotated once for each blank. To this end the roll is notched out or broken for a considerable distance around its periphery, as at 194, so that at the broken portion there will be no engagement between the roll and the blank, and accordingly no tendency on the part of the roll to rotate. The notch 194 is located adjacent the die so that after the die has stamped the blank the engagement between the roll and the blank will be broken.

Secured to the side of the roll and projecting beyond the periphery thereof is an arm 196 which carries in its outer end a small roller 198. The roll 114 is provided with a counterbalance 200 so positioned on the roll as to cause the roller 198 to engage the under surface of a blank passing through the feeding rolls and to be moved into the path of a succeeding blank when allowed to do so by the removal of the previous one. The incoming blank will then strike the roller 198 and cause the roll 114 to rotate until the frictional element 193 is in contact with the under side of the blank. This engagement will cause the roll 114 to rotate until the blank has been stamped and the notch 194 has again reached the uppermost position and disengaged the roll from the blank.

Since the manner in which the different parts of the machine operate to perform their functions and the sequence of the operations as a whole have been set forth in connection with the detailed description of the machine, no further description is necessary for a complete understanding of the invention.

Having described my invention, what I claim as new and desire to secure by Letters Patent of the United States is:

1. A machine of the class described having in combination, blank supporting means, means for operating on the blanks while on said support, means for removing the blanks from the support, and conveyors for carrying alternate blanks in opposite directions.

2. A machine of the class described having in combination, blank supporting means, means for operating on the blanks on said supporting means, a plurality of conveyors adjacent the support adapted to carry the blanks in opposite directions, and means for automatically transferring the blanks from the support to the conveyors.

3. A machine of the class described having in combination, an endless conveyor for supporting blanks, operating means adjacent said conveyor, a plurality of inclined plates arranged in different planes to which the conveyor delivers, and means by which the blanks are allocated to the different plates.

4. A machine of the class described having in combination, an endless conveyor for supporting and transferring blanks, operating means adjacent said conveyor, a plurality of means located at the discharge end of said conveyor for moving the blanks in opposite directions, and means for allocating the blanks to each of the latter means from the conveyor.

5. A machine of the class described having in combination, an endless conveyor for supporting blanks in a horizontal plane, operating means adjacent said conveyor, a plurality of conveyors arranged transversely to the path of the endless conveyor and at the discharge end thereof, the said latter conveyors consisting of oppositely driven rollers, and means for automatically transferring the blanks from the endless conveyor to the latter conveyors.

6. A machine of the class described having in combination, means for cutting the ends of a blank, means for bending the blank into annular form, and means for transferring the blank from the cutting means to the bending means.

7. A machine of the class described having in combination, an endless conveyor for supporting blanks, shearing means adapted to operate on the ends of blanks on the conveyor, means for intermittently operating the said conveyor, a plurality of circling devices arranged on opposite sides of the machine, and means for transferring the blanks from the conveyor to the circling devices.

8. A machine of the class described having in combination, an endless conveyor for supporting blanks, shearing means adapted to operate on the blanks supported on the conveyor, a plurality of circling devices arranged on opposite sides of the machine, means for removing the blanks from the conveyor, and means for feeding alternate blanks in opposite directions to the circling devices.

9. A machine of the class described having in combination, an endless conveyor for supporting blanks, means for operating on the blanks supported thereby, a plurality of circling devices arranged on opposite sides of the machine, separate means for feeding blanks to each circling device, and means for transferring the blanks from the endless conveyor to the feeding means.

10. A machine of the class described having in combination, means for supporting and conveying blanks, operating means adjacent said support, circling means located on opposite sides of the machine, means for removing the blanks from the conveyor, and means for conveying the blanks in a path transversely to the path of the conveyor into the circling means.

11. A machine of the class described having in combination, means for shearing the ends of blanks, means for polishing the ends of the blanks, means for bending the blanks into circular form, and automatic means for automatically transferring the blanks successively to each of said means.

12. A machine of the class described having in combination, means for shearing the ends of blanks, means for polishing the ends of the blanks, means for stamping the blanks, means for bending the blanks into circular form, and means for automatically transferring the blanks to each of said means.

13. A machine of the class described having in combination, means for shearing the ends of a blank, means for polishing the ends of the blank, means operated by the blank for stamping the blank, and means for conveying the blank successively to each of said means.

14. A machine of the class described having in combination, an endless conveyor for supporting a plurality of blanks, reciprocating means for shearing the ends of the blanks, means for moving the conveyor in timed relation to said cutting means, a polishing device located upon each side of the conveyor and adapted to engage the ends of the blanks, and means above each of said devices for forcing the blanks into engagement therewith.

15. A machine of the class described having in combination, an endless conveyor for supporting and feeding blanks in a horizontal plane, means for shearing both ends of the blanks while supported thereon, means for bending the blanks into circular form, means for transferring the blanks from the endless conveyor to the bending means, the transferring means including a pair of feed rolls, and means on one of said rolls for stamping the blanks.

16. A machine of the class described having in combination, an endless conveyor for supporting and feeding blanks in a horizontal plane, means for shearing the ends of the blanks while supported thereon, means adjacent each side of the conveyor in the path of the blanks for polishing the ends of the blanks, means located on opposite sides of the conveyor for bending the blanks into circular form, and means for transferring the blanks from the conveyor to each bending means, the said transferring means comprising inclined plates arranged in different inclined planes, means associated with the conveyor for lifting the blanks upon the higher plates, and means for receiving the blanks from the inclined plates and feeding them in opposite directions to the bending means.

DALLAS C. CARROLL.